A. R. CUSHMAN.
Wagon-Brake.
No. 203,247. Patented May 7, 1878.
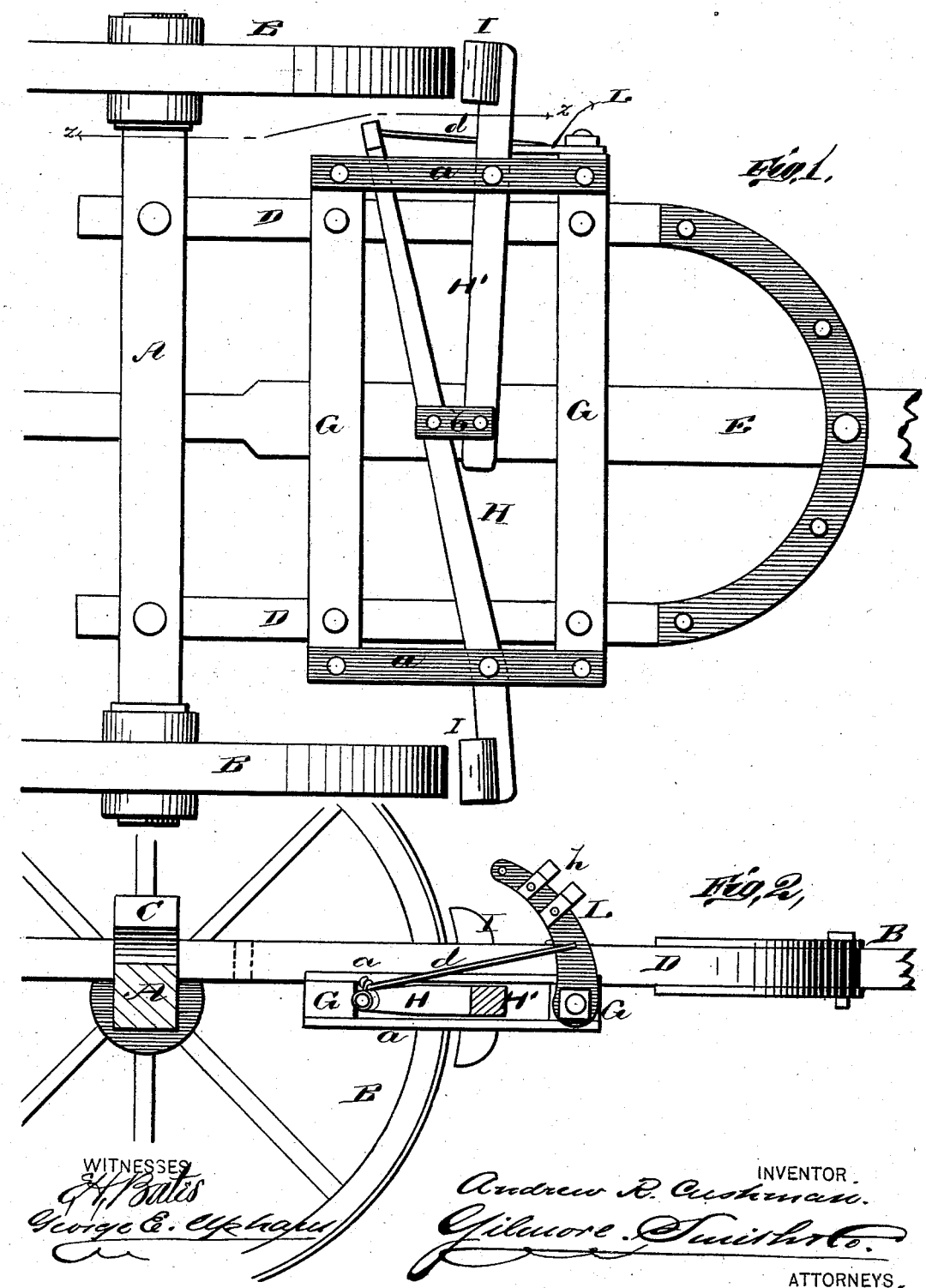

UNITED STATES PATENT OFFICE.

ANDREW R. CUSHMAN, OF MEMPHIS, MISSOURI.

IMPROVEMENT IN WAGON-BRAKES.

Specification forming part of Letters Patent No. 203,247, dated May 7, 1878; application filed October 20, 1877.

*To all whom it may concern:*

Be it known that I, ANDREW R. CUSHMAN, of Memphis, in the county of Scotland and State of Missouri, have invented a new and valuable Improvement in Wagon-Brakes; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan of a wagon with my brake attached, and Fig. 2 is a part sectional side view of my wagon-brake as applied.

The nature of my invention consists in the construction of a frame with brake-levers, and a device for operating the same, the whole being applicable to be fastened to the hind hounds of a wagon or other vehicle, as will be hereinafter more fully set forth.

The annexed drawing, to which reference is made, fully illustrates my invention.

A represents the rear axle, with wheels B B, bolster C, hounds D D, and reach E, of a wagon or other vehicle.

G G represent two parallel bars, connected at the ends by straps or bars *a a*, forming a frame. H H' represent the two brake-levers, provided with brake-shoes I I at their outer ends. These levers pass between and are pivoted to the straps or bars *a a*, one at each end of the frame.

The lever H' is made short, and extends only to about the center of the frame G *a*, and its inner end is, by straps *b* or other suitable means, connected to the lever H. This latter lever is made long, and projects between the bars *a a* at the opposite end of the frame from that in which said lever is pivoted.

The long end of the lever H is by a rod, *d*, connected with a curved arm, L, pivoted to the end of the front bar G. This curved arm is provided with a socket, *h*, for the insertion of an arm or lever by which the brake is to be operated.

It will readily be seen that by throwing the arm L forward the shoes on the ends of both the arms H H' are applied to the wheels.

The whole frame G *a*, with the brake levers, shoes, and arm, can be made and sold separately, and applied to any wagon by securely fastening the frame at proper point to the rear hounds D D.

What I claim as new, and desire to secure by Letters Patent, is—

The frame G *a*, secured to the rear hounds of a wagon, in combination with pivoted levers H H', brake-shoes I I, and operating mechanism, substantially as shown and described.

In testimony that I claim the above I have hereunto subscribed my name in the presence of two witnesses.

ANDREW R. CUSHMAN.

Witnesses:
THOMAS M. SMITH,
HENRY SOMERS.